United States Patent
Gonthier et al.

(10) Patent No.: US 6,496,643 B1
(45) Date of Patent: Dec. 17, 2002

(54) INTERNAL TERMINATION FOR OPTICAL FIBERS

(75) Inventors: Francois Gonthier, Ville Mont-Royal (CA); Arnaud Symon, Montreal (CA)

(73) Assignees: ITF Optical Technologies Inc., Montreal (CA); ITF Technologies Optiques Inc., Montreal (CA)

(*) Notice: Subject to any disclaimer, the term of this patent is extended or adjusted under 35 U.S.C. 154(b) by 40 days.

(21) Appl. No.: 09/714,709

(22) Filed: Nov. 17, 2000

(51) Int. Cl.$^7$ .............................. G02B 6/00; G02B 6/26
(52) U.S. Cl. .................. 385/139; 385/123; 385/140
(58) Field of Search ........................... 385/139, 140, 385/123, 127, 126

(56) References Cited

U.S. PATENT DOCUMENTS

| | | | |
|---|---|---|---|
| 5,048,908 A | | 9/1991 | Blonder et al. ............ 385/39 |
| 5,251,277 A | * | 10/1993 | Young, Jr. ................ 385/11 |
| 5,253,312 A | | 10/1993 | Payne et al. .............. 385/31 |
| 5,257,335 A | | 10/1993 | Kurata et al. ............. 385/78 |
| 5,263,103 A | | 11/1993 | Kosinski .................. 385/31 |
| 5,572,618 A | * | 11/1996 | DiGiovanni et al. ........ 385/140 |
| 5,619,610 A | * | 4/1997 | King et al. ............... 385/139 |
| 5,651,085 A | * | 7/1997 | Chia ...................... 385/140 |
| 5,841,926 A | * | 11/1998 | Takeuchi et al. ........... 385/123 |
| 5,970,197 A | | 10/1999 | Pavlath ................... 385/123 |
| 6,097,874 A | | 8/2000 | Yunoki .................... 385/140 |
| 6,115,524 A | * | 9/2000 | Burke et al. .............. 385/123 |

FOREIGN PATENT DOCUMENTS

| | | | |
|---|---|---|---|
| DE | 3326406 | 2/1985 | ........... H04B/9/00 |
| DE | 4119015 | 5/1994 | ........... G02B/6/00 |
| WO | WO9954767 | 10/1999 | ........... G02B/6/26 |

OTHER PUBLICATIONS

Yoshiaki Takeuchi et al.; SC–type Fixed Optical Attenuator Using Metal–ion Doped Optical Fiber; Mar. 1997; pp. 78–83; NTT Review.

* cited by examiner

*Primary Examiner*—John D. Lee
*Assistant Examiner*—Scott A Knauss
(74) *Attorney, Agent, or Firm*—George J. Primak

(57) ABSTRACT

A reflectionless termination is provided for an optical fiber that has a core and a cladding. The optical fiber forms part of a device which is mounted in a package and the termination fits inside the package. The termination consists of a short piece of an attenuating fiber connected at the end of the optical fiber and having a doped core which absorbs the light emanating from the core of the optical fiber.

19 Claims, 2 Drawing Sheets

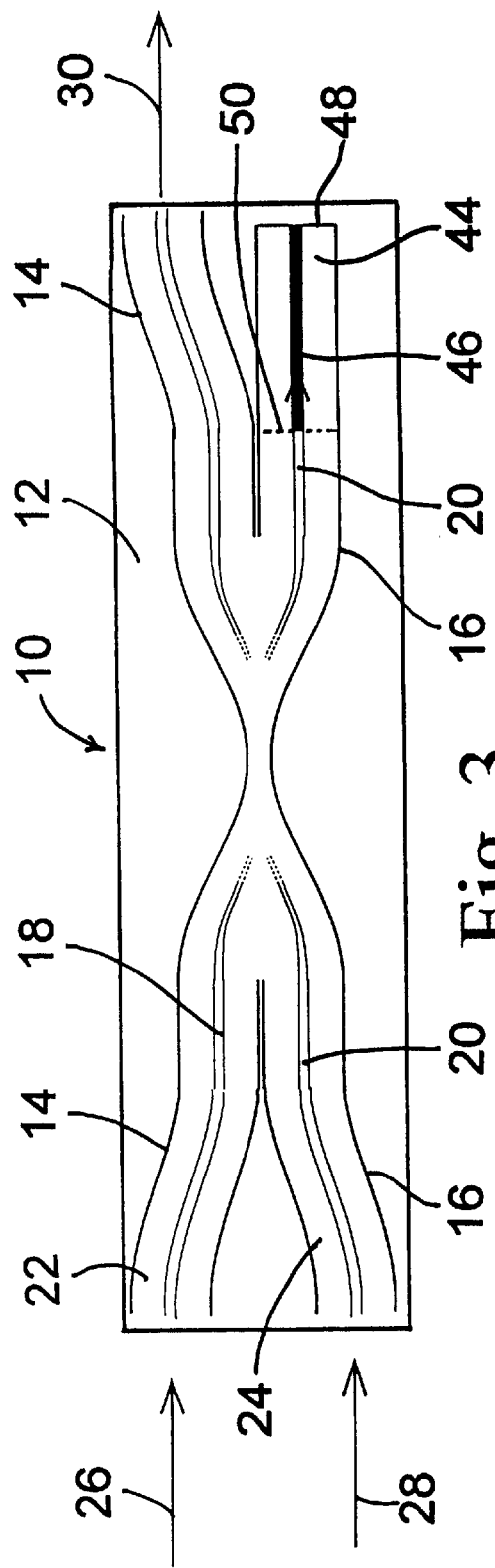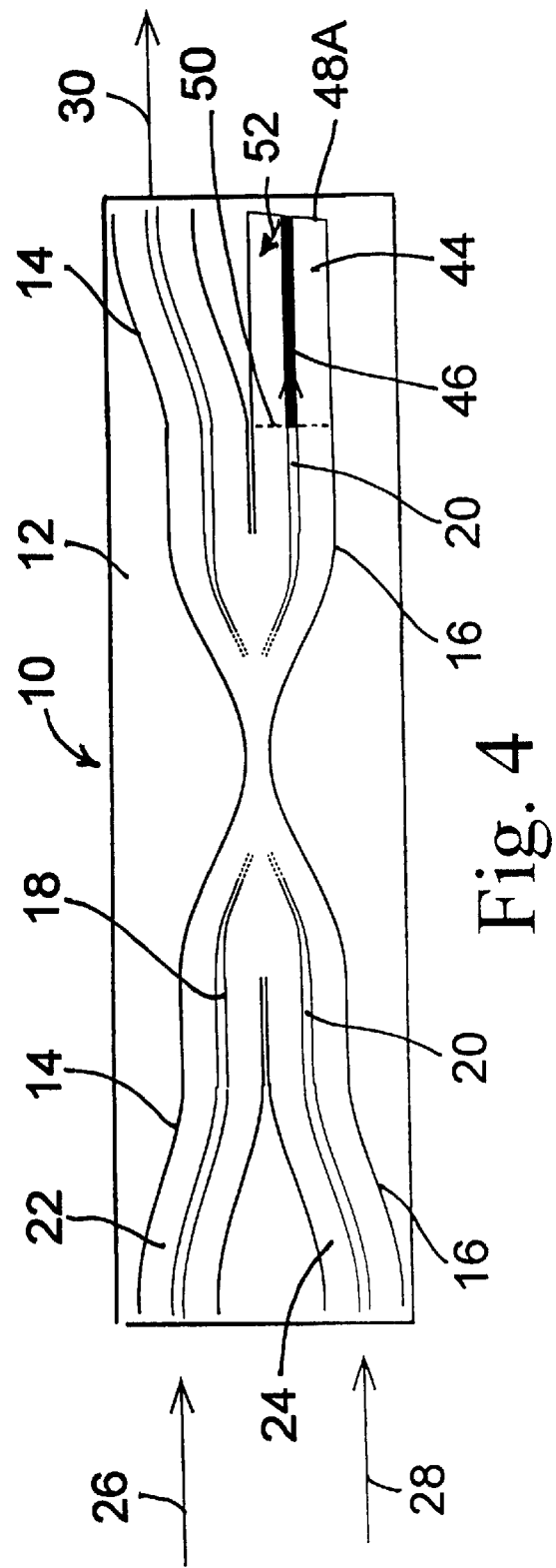

INTERNAL TERMINATION FOR OPTICAL FIBERS

FIELD OF THE INVENTION

This invention relates to optical fiber terminations. In particular it relates to terminations which produce essentially no light reflection into the fiber core, thus avoiding the optical return loss (ORL), and which are sufficiently short to be included within the packaging of the fiber optic device in which the termination is made.

BACKGROUND OF THE INVENTION

Many fiber optic devices include optical fibers that are not used. One such device is a 2×2 coupler in which light emanating from two ports is coupled and exits via one port. It is desirable in such cases to provide the end of the unused fiber with a termination which will minimize or even eliminate reflection of light back into the fiber core and thereby avoid the ORL that is produced by such reflection and which may disturb the operation of the laser.

It is known that reflections can be essentially eliminated if the fiber end is cleaved at an angle such that light is reflected into the cladding of the fiber and none of the light goes back into the core of the fiber. However, the surface of such cleavage must be extremely well polished to achieve a satisfactory performance. The presence of even the slightest discontinuity, such as specks of dust, will severely disturb the proper reflection of the light and will usually lead to some of the light being reflected into the core, thus producing an optical return loss (ORL). This requirement of very high polish of the angular end face is a significant disadvantage as has, for instance, been recognized in U.S. Pat. No. 5,263,103. To obviate this disadvantage, U.S. Pat. No. 5,263,103 provides for an attachment to the end of the fiber of a terminator that has a substantially constant refractive index, such as a core-less silica fiber. It is, however, indicated in this patent that the length of such terminator must be 3 cm or more in order to achieve a back reflection of approximately −70 dB. Such a length normally puts the termination outside of the package of the device, which in itself is a disadvantage, since it requires some kind of external protection for the termination or an extension of the package for the device.

There is, therefore, a need for a termination that would be short enough to be included within the package of the fiber optic device, which is herein called an internal termination for optical fibers.

OBJECTS AND SUMMARY OF THE INVENTION

It is, therefore, an object of the present invention to provide an internal (short) termination for an optical fiber having a core and a cladding.

Another object is to provide a simple and effective termination which essentially eliminates the ORL.

Other objects and advantages of the invention will be apparent from the following description thereof.

In essence, the present invention comprises a termination for an optical fiber having a core and a cladding and being a part of an optical device mounted in a package, which termination comprises a short length of an attenuating fiber with a doped core connected to the end of the optical fiber which is being terminated, the attenuation produced by the doped core and the length of the attenuating fiber being selected so as to fit within the package of the device, while essentially eliminating light reflection into the optical fiber.

The length of the attenuating fiber should normally not exceed 1 cm and it can be connected to the end of the optical fiber by fusion splicing or a similar technique.

To achieve an essentially reflectionless termination (e.g. having −60 dB or less of back reflection or ORL), the core of the attenuating fiber should preferably have an attenuation of at least 20 dB/cm The attenuating fiber should be of such quality and composition as to avoid defects and/or compositional elements that can diffuse light back into the core of the optical fiber. This can be achieved with attenuating fibers available on the market which are doped with transition metals such as cobalt, nickel and copper. Such fibers are disclosed, for example, in U.S. Pat. No. 6,097,874 where they are used as an optical attenuator. There is, however, no hint in this patent that a short length of such attenuating fiber could provide an internal termination for an optical fiber of a fiber optic device, as has been found by the present applicants.

The doped core of the attenuating fiber normally has the same diameter as the core of the optical fiber to be terminated. However, the diameters need not be precisely identical, so long as light coming out of the optical fiber to be terminated flows into the doped core of the attenuating fiber and is absorbed therein. Moreover, the modes between the cores of the optical fiber to be terminated and the attenuating fiber connected thereto should be substantially matched so as to minimize or eliminate any back refection at the connection.

Part of the light absorption takes place when the light travels forward in the doped core of the attenuating fiber until it reaches the outer end of the fiber where some of the light will escape out of the attenuating fiber and some will be reflected back into the attenuating fiber where it will be re-absorbed by the doping in the fiber core. Thus, depending on the desired length of the termination, an attenuation of 20 dB/cm is sufficient to achieve an essentially reflectionless internal termination.

The outer end of the short length of the attenuating fiber need not be of any particular configuration or polish. However, it may be cleaved at an angle so that any light reflected back into the attenuating fiber will be reflected not only into the core but also into the cladding thereby increasing the attenuation. However, unlike in the prior art situations, such angular end need not be extremely smooth, because the doped core provides its own attenuation and there is thus no objection that some of the light be reflected back into the core of the attenuating fiber.

BRIEF DESCRIPTION OF THE DRAWINGS

A preferred embodiment of the invention will now be described with reference to the appended drawings, in which:

FIG. 3 illustrates a configuration of a 2×2 coupler within the confines of a package having an internal termination provided by a piece of attenuating fiber in accordance with the present invention; and FIG. 4 illustrates the configuration shown in FIG. 3 where the end of the attenuating fiber is cleaved at an angle,

DETAILED DESCRIPTION OF THE PREFERRED EMBODIMENT

Figure 1:
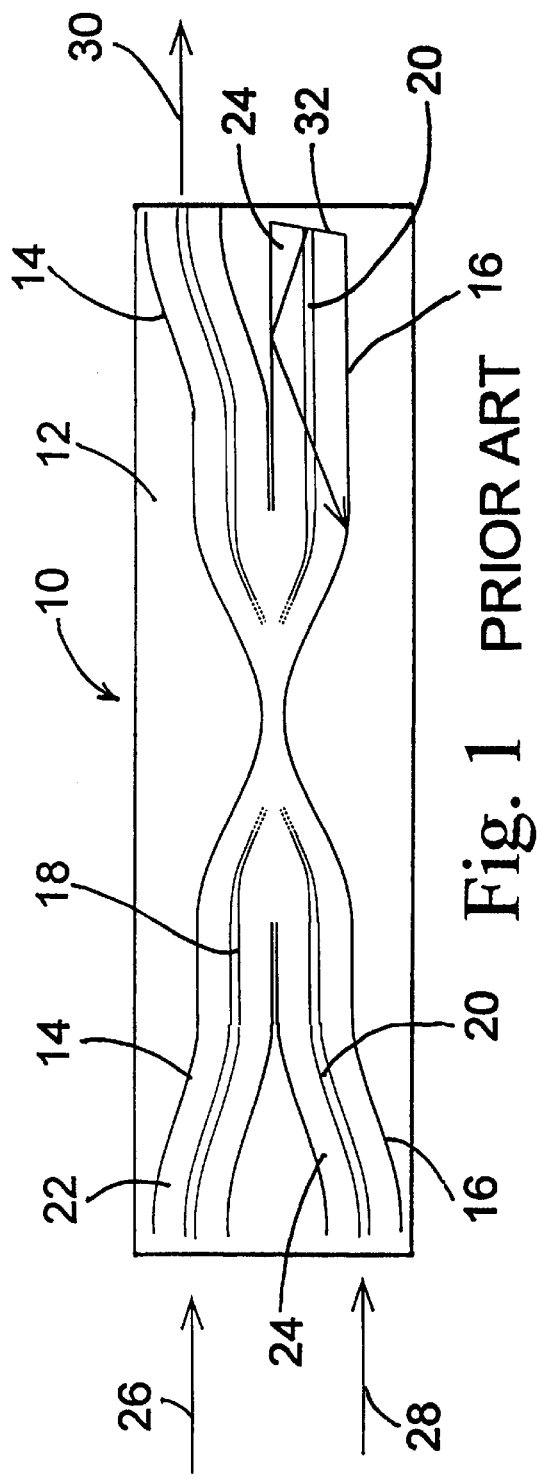
FIG. 1 illustrates a prior art configuration of a 2×2 coupler within the confines of a package, having a cleaved termination for one of its exit fibers.

Referring to the drawings in which the same elements are designated by the same reference numbers, FIG. 1 illustrates a configuration which is known in the prior art and in which a 2×2 coupler 10 is mounted within a package 12. The coupler is made of optical fibers 14 and 16 having cores 18 and 20 respectively and claddings 22 and 24 respectively. Light is projected into the cores 18, 20 by means of a laser as shown by arrows 26, 28. At the other end of the coupler, most of the light exits through fiber 14 only as shown by arrow 30, while fiber 16 is terminated by having its end 32 cleaved at an angle, usually of between 5° and 10°, so that the portion of the light that passes through the core 20 of this fiber is reflected back into the cladding 24 where it is dissipated. This requires that the end 32 be extremely smooth or polished, otherwise some light will go back into the core 20 producing an ORL.

Figure 2:
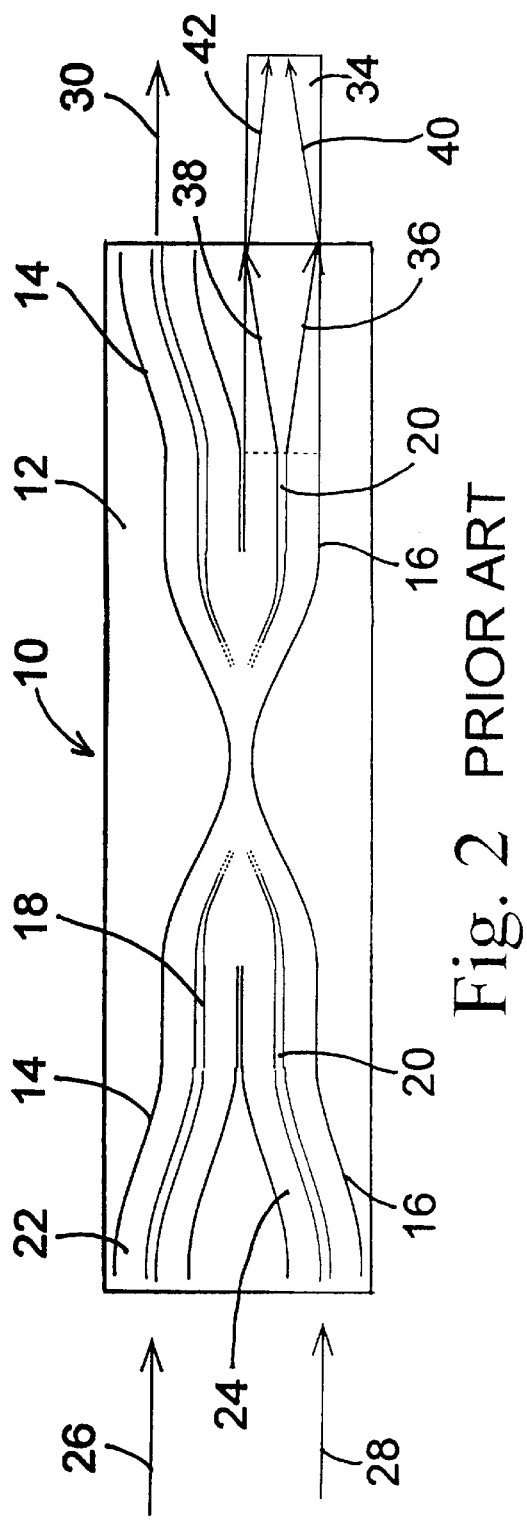
FIG. 2 illustrates a prior art configuration of a 2×2 coupler within the confines of a package, having a connection of a core-less fiber projecting outside of the confines of the package.

FIG. 2 illustrates another known termination arrangement in which cleaved end 32 of fiber 16 is replaced by a piece of core-less fiber 34 where the light emanating from the core 20 of fiber 16 is dissipated as illustrated by arrows 36, 38 and 40, 42. The problem with this arrangement is that it requires a fairly long piece of fiber 34 that will usually go beyond the confines of the package 12.

FIG. 3 illustrates an embodiment of an internal termination in accordance with the present invention. Here again, light represented by arrows 26, 28 is injected into cores 18, 20 of fibers 14, 16 of the coupler 10 confined within package 12. Most of the light exits via exit fiber 14 as shown by arrow 30. Some of the light will go into exit fiber 16 through core 20 which is terminated in such a way that essentially none of such light would be reflected back into core 20 at this end, while keeping the termination within the confines of the package 12. This is done by connecting, for example, by fusion splicing, a short length of attenuating fiber 44 to the outer end of fiber 16 which thereby produces an interface 50. The connected fibers are in intimate contact with each other at the interface 50. The attenuating fiber 44 has a doped core 46 which in this case has been doped with cobalt so that its attenuation at 1310 nm is 49.0±1.0 dB/23 mm and at 1550 nm is 46.8±1.0 dB/23 mm. Core 46 abuts core 20 so that the light emanating from core 20 propagates through core 46 while being absorbed therein. Any light remaining at the end 48 of fiber 44 will either dissipate outwardly or be reflected back into the core 46 where it will be re-absorbed by the doping. A 1 cm length of fiber 44 has been found sufficient to provide an ORL which is quite satisfactory for most terminations. Such small length of fiber 44 is easily included within the confines of packaging 12. The end face 48 of the attenuating fiber 44 need not have any special configuration or polish It can be simply broken-off or cut-off and/or coated with adhesive or the like. However, as shown in FIG. 4, it may be preferable to cleave it at a predetermined angle, (e.g. between 5° and 10°) so that any light emanating from the core 46 at the end 48A be directed at least partly into the cladding of fiber 44, as shown by arrow 52, where it would quickly dissipate. This will usually lead to an even shorter termination for the same attenuating fibers. The cleaved angular end 48A need not be highly polished since there is no harm if some of the light goes back into core 46 where it will be re-absorbed.

As mentioned above, the attenuating fiber 44 used for the purposes of this example was a fiber with the core that has been doped with cobalt. Its designation by the manufacturer Institut National D'Optique is HAF-CMS. It had a core diameter of 8.6 µm. However, as already mentioned, other suitable attenuating fibers can be used, provided their attenuation is such as to produce a desired absorption of light within a short length of fiber that can fit within the packaging of the optical fiber device. Preferred attenuation is 20 dB/cm or greater, and the length of the attenuating fiber should normally not exceed about 1 cm, although it could be longer if the length of the package permits it.

The coupler fibers 14 and 16 used in this example were SMF-28 fibers produced by Corning; The connection at the interface 50 was done by fusion splicing.

It should be noted that the invention is not limited to the specific embodiment described above, but that obvious modifications can be made by a person skilled in the art without departing from the invention and the scope of the following claims.

What is claimed is:

1. A termination for an optical fiber having a core and a cladding, which forms part of an optical device mounted in a package, said termination comprising a short length of an attenuating fiber with a doped core fusion spliced to the optical fiber end to be provided with the termination, said attenuating fiber having an attenuation and length such as to form an essentially reflectionless termination that fits inside the package.

2. A termination according to claim 1, in which the attenuating fiber is of such quality and composition as to avoid defects and/or compositional elements that can diffuse light back into the core of the optical fiber.

3. A termination according to claim 1, in which the attenuation produced by the attenuating fiber is at least 20 dB/cm.

4. A termination according to claim 1, in which the length of the attenuating fiber is 1 cm or less.

5. A termination according to claim 1, in which the core of the attenuating fiber is doped with cobalt.

6. A termination according to claim 1, in which the diameter of the core of the attenuating fiber is substantially the same as the diameter of the core of the optical fiber provided with the termination.

7. A termination according to claim 6, in which the modes between the cores of the optical fiber and the attenuating fiber fusion spliced thereto are substantially matched so as to minimize or eliminate any back reflection where the fibers are fusion spliced.

8. A termination according to claim 1, in which the attenuating fiber is broken-off, cut-off and/or coated with adhesive at its outer end.

9. A termination according to claim 1, in which the attenuating fiber has an outer end which is cleaved at a predetermined angle.

10. A termination according to claim 1, in which the attenuation and the length of the attenuating fiber are such as to produce −60 dB or less of optical return loss.

11. A fiber optic coupler made of fibers having a core and a cladding, said coupler being enclosed in a package and having a port provided with a termination, characterized in that said termination is made of a short length of an attenuating fiber having a doped core, with an end of said attenuating fiber being fusion spliced to the end of the port so that the core of the attenuating fiber abuts the core of said port, said doped core of the attenuating fiber being adapted to produce an attenuation that forms an essentially reflectionless termination that fits inside the package.

12. A fiber optic coupler according to claim 11, in which said doped core of the attenuating fiber produces an attenuation of at least 20 dB/cm.

13. A fiber optic coupler according to claim 12, in which the length of the attenuating fiber is 1 cm or less.

14. A fiber optic coupler according to claim 11, in which the core of the attenuating fiber is doped with cobalt.

15. A fiber optic coupler according to claim 11, in which the diameter of the core of the attenuating fiber is substantially the same as the diameter of the core of the port provided with the terminator.

16. A fiber optic coupler according to claim 15, in which the modes between the cores of the port provided with the termination and the attenuating fiber spliced thereto are substantially matched so as to minimize any back reflection.

17. A fiber optic coupler according to claim 15, in which the attenuating fiber is broken-off, cut-off and/or coated with adhesive at its outer end.

18. A fiber optic coupler according to claim 11, in which the attenuating fiber has an outer end which is cleaved at a predetermined angle.

19. A fiber optic coupler according to claim 11, in which the attenuation and the length of the attenuating fiber are adapted to produce −60 dB or less of optical return loss.

* * * * *